US010109063B2

(12) United States Patent
Attar et al.

(10) Patent No.: US 10,109,063 B2
(45) Date of Patent: Oct. 23, 2018

(54) IMAGE PROCESSING IN A MULTI-CHANNEL CAMERA

(71) Applicant: LinX Computational Imaging Ltd., Zichron Yaakov (IL)

(72) Inventors: Ziv Attar, Zichron Yaakov (IL); Andrey Tovchigrechko, Vilnius (LT)

(73) Assignee: Apple Inc., Cupertino, CA (US)

( * ) Notice: Subject to any disclaimer, the term of this patent is extended or adjusted under 35 U.S.C. 154(b) by 484 days.

(21) Appl. No.: 14/411,380

(22) PCT Filed: Jul. 3, 2013

(86) PCT No.: PCT/IB2013/002164
§ 371 (c)(1),
(2) Date: Dec. 24, 2014

(87) PCT Pub. No.: WO2014/006514
PCT Pub. Date: Jan. 9, 2014

(65) Prior Publication Data
US 2015/0124083 A1    May 7, 2015

Related U.S. Application Data

(60) Provisional application No. 61/667,960, filed on Jul. 4, 2012.

(51) Int. Cl.
*H04N 5/247* (2006.01)
*H04N 9/09* (2006.01)
(Continued)

(52) U.S. Cl.
CPC .......... *G06T 7/2093* (2013.01); *G06T 3/4038* (2013.01); *G06T 7/292* (2017.01);
(Continued)

(58) Field of Classification Search
None
See application file for complete search history.

(56) References Cited

U.S. PATENT DOCUMENTS 6,611,289 B1    8/2003  Yu et al.
8,619,082 B1 *  12/2013  Ciurea ................ H04N 13/232
                                                         345/427
(Continued)

FOREIGN PATENT DOCUMENTS

WO    WO 2011/101036 A1      8/2011
WO    WO 2011101036 A1 *    8/2011  .......... G06T 7/0065
WO    WO 2012/057620 A2      5/2012

OTHER PUBLICATIONS

PCT International Search Report and Written Opinion, PCT/IB2013/002164, dated Mar. 27, 2014, 13 Pages.

*Primary Examiner* — William C Vaughn, Jr.
*Assistant Examiner* — Lindsay Uhl
(74) *Attorney, Agent, or Firm* — Blank Rome LLP

(57) ABSTRACT

An imaging system is configured to identify an object represented by a plurality of preliminary images. The preliminary images are each associated with a different camera imaging channel, and include different image information. An object distance is determined based on the difference in preliminary image information. An object shift is determined based on the object distance and a pre-determined relationship between object shift and object distance. The object shift is applied to the portions of one or more preliminary images representing the object to form shifted preliminary images, and the shifted preliminary images are combined to form a final image.

20 Claims, 6 Drawing Sheets

(51) Int. Cl.
  *G06T 7/50*     (2017.01)
  *G06T 7/90*     (2017.01)
  *G06T 7/20*     (2017.01)
  *G06T 3/40*     (2006.01)
  *H04N 9/097* (2006.01)
  *G06T 7/30*     (2017.01)
  *G06T 7/292*    (2017.01)

(52) U.S. Cl.
  CPC ............... *G06T 7/30* (2017.01); *H04N 5/247* (2013.01); *H04N 9/097* (2013.01); *G06T 2207/10004* (2013.01); *G06T 2207/10024* (2013.01); *G06T 2207/30241* (2013.01)

(56) References Cited

U.S. PATENT DOCUMENTS

| | | | |
|---|---|---|---|
| 9,495,751 B2* | 11/2016 | Wajs | G06T 7/0065 |
| 2005/0083531 A1 | 4/2005 | Millerd et al. | |
| 2006/0038891 A1 | 2/2006 | Okutomi et al. | |
| 2006/0054782 A1* | 3/2006 | Olsen | H01L 31/02325 |
| | | | 250/208.1 |
| 2011/0080487 A1* | 4/2011 | Venkataraman | H04N 5/2253 |
| | | | 348/218.1 |
| 2012/0105690 A1* | 5/2012 | Waqas | G03B 9/02 |
| | | | 348/252 |
| 2012/0147205 A1 | 6/2012 | Lelescu et al. | |
| 2012/0188389 A1* | 7/2012 | Lin | H04N 5/2258 |
| | | | 348/218.1 |
| 2012/0189195 A1* | 7/2012 | Paik | H04N 5/23212 |
| | | | 382/164 |
| 2014/0232900 A1* | 8/2014 | Wernersson | H04N 5/2251 |
| | | | 348/223.1 |

* cited by examiner

IMAGE PROCESSING IN A MULTI-CHANNEL CAMERA

CROSS REFERENCE TO RELATED APPLICATIONS

This application claims priority to U.S. Provisional Application No. 61/667,960, filed on Jul. 4, 2012, the contents of which are hereby incorporated by reference in their entirety.

BACKGROUND

Technical Field

This disclosure relates to image processing, and more specifically, to image processing in a camera system with multiple imaging channels.

Description of Related Art

Cameras with multiple imaging channels enable the extraction of distance information for objects in a captured image. For example, a captured image of a scene including a dog, a tree, and a cloud can be analyzed to determine a first distance from the camera to the dog, a second distance from the camera to the tree, and a third distance from the camera to the cloud. The distance between lenses in such cameras can create a parallax effect causing objects to appear at different positions within the images captured by each imaging channel. Calculating the position shifts of such objects between images enables the calculation of distance between objects in a scene.

When a multi-channel camera system captures an image, each channel captures a preliminary image of a scene from a slightly different perspective. The camera system then combines the preliminary images to form a final image. Prior to combining the preliminary images, the camera system modifies the preliminary images to ensure that any object in the preliminary images appears in the same location in each preliminary image. This modification of the preliminary images is referred to herein as "registration", and requires 1) detecting and measuring object misalignment between preliminary images, and 2) applying a shift to misaligned objects ("object shift" hereinafter) in the preliminary images based on the measured misalignment.

Object misalignment between preliminary images can be measured using common image features (such as edges, patterns, and the like) detected in the preliminary images and comparing them until a shift is calculated. Relying on common image features to measure misalignment requires a particular feature to exist in at least two preliminary images. In an example camera system with three imaging channels (a "red channel" with a red filter, a "blue channel" with a blue filter, and a "green channel" with a green filter), an image feature can exist in one preliminary image, but not the other two. Such a problem can be solved by adding a redundant imaging channel (such as an extra green channel) to ensure that the image feature appears in at least two preliminary images.

Once a shift is calculated for a particular image feature associated with an object in a subset of the preliminary images, the distance of the object from the camera ("object distance" hereinafter) can be determined. Accordingly, since calculated object shifts during registration are dependent on the object distance, it is possible to calculate the shift that needs to be applied to the object in the remaining preliminary images. For example, in a four channel camera system having one red channel, one blue channel, and two green channels, an image feature can be identified in the preliminary images captured via the green channels. A shift can be calculated for the object associated with the image feature using the preliminary images captured by the green channels, and an object distance can be determined based on the calculated shift. When an object distance is known for the object associated with the image feature, a shift can be calculated and applied to the object in the preliminary images captured by the red and blue channels. The magnitude and direction of object shifts applied to each channel can vary based on the physical arrangement of the imaging lenses and the baseline between the each imaging channel's aperture.

In one embodiment, the multi-lens camera system described herein includes four lenses in a 2×2 array, one lens including a color filter associated with each of the colors red, green, blue, and white (also referred to as a "clear" filter). In such an embodiment, the white color filter includes higher light transmission characteristics, for instance including a broader passband and allowing a greater frequency range of light to pass through the filter. Accordingly, the white filter allows for the capture of preliminary images with higher signal-to-noise ratios and better low light performance. In addition, the inclusion of a white color filter enables the calculation of two sources of luminance: the signal from the white channel and the combined signals from the red, blue, and green channels. Such a configuration beneficially provides two luminance signals with different intensities that can be combined to form a combined luminance signal with a higher dynamic range than either individual luminance signal.

One challenge introduced with the use of three or more imaging channels, each including a different color filter is the possibility that a particular image feature may not appear in more than one preliminary image in view of the different spectra associated with each imaging channel. Accordingly, it is desirable to ensure that a shift can be calculated for any given image feature in a camera system with three or more color channels, each associated with a chromatically different filter.

BRIEF DESCRIPTION OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

It should be noted that in one example embodiment of a camera system described herein is to enable the efficient registration of objects in multiple preliminary images captured by multiple imaging channels to form a final image. In addition, the color accuracy of the final image can be improved by defining the spectral response of the color filters that are included within one or more imaging channels. Finally, object occlusions as a result of the distance between lenses associated with imaging channels can be detected and corrected.

It is noted that, as further described herein, an "imaging channel" has a camera lens and aperture configured to capture an image. A multi-channel camera is a camera with multiple lens and apertures, configured to capture multiple images simultaneously or near-simultaneously. It should be noted, however, that the principles described herein can equally apply to a multiple-aperture camera with one lens, to single-aperture cameras configured to capture multiple images, and to multi-camera systems configured to capture substantially the same image from different locations. In various embodiments, each aperture is associated with a distinct image sensor configured to capture light incident upon the image sensor via the aperture. Alternatively, multiple apertures can be associated with various portions of an image sensor. Each imaging channel can include one or more color filters integrated within the imaging channel.

Example Camera System

Figure 1:
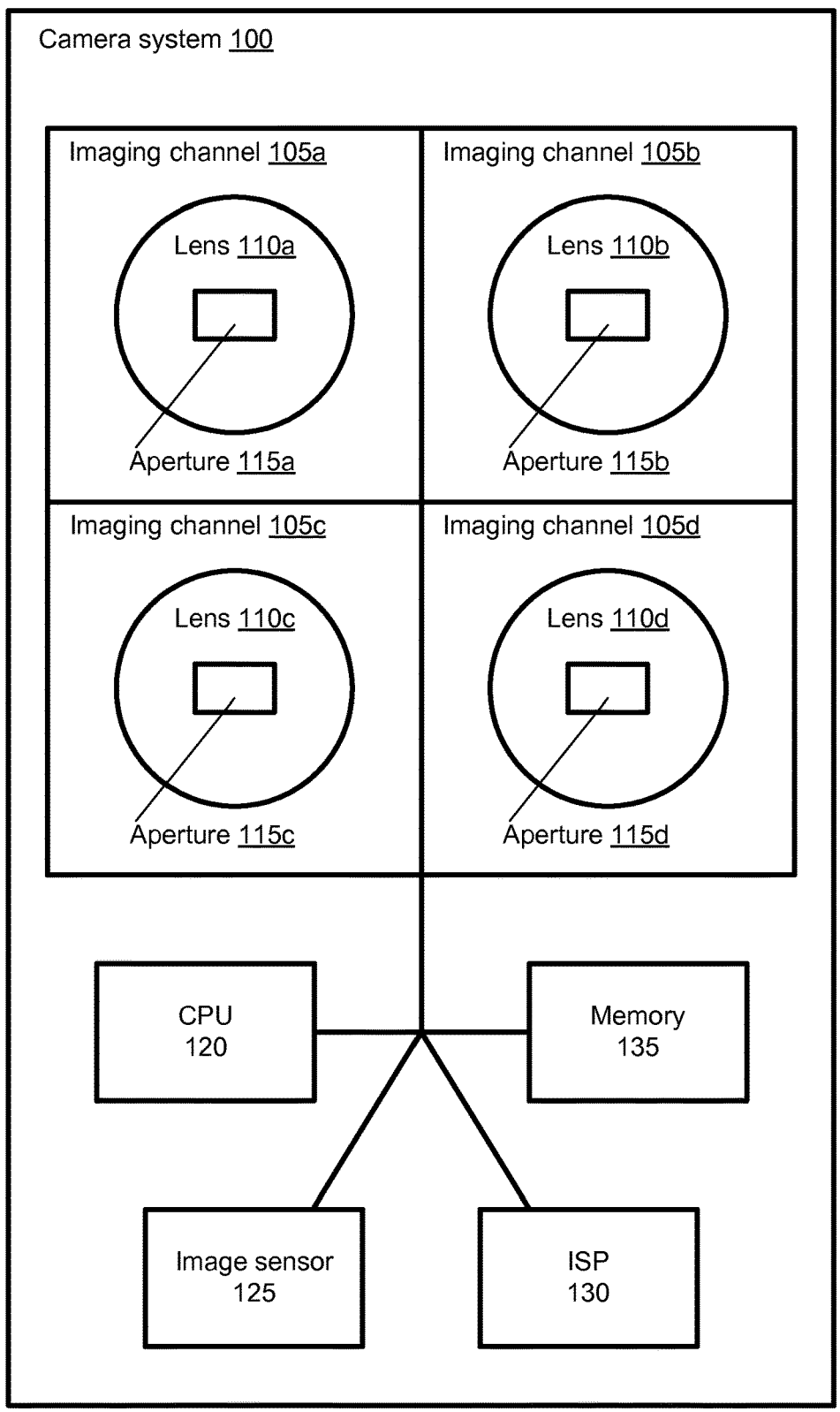
FIG. 1 illustrates a camera system with multiple imaging channels, according to one example embodiment.

FIG. 1 illustrates a camera system with multiple imaging channels, according to one example embodiment. The camera system 100 in the embodiment of FIG. 1 includes four imaging channels, imaging channels 105a, 105b, 105c, and 105d (collectively "imaging channels 105"). Each imaging channel 105a-d includes a lens 110a-d ("lenses 110") and an aperture 115a-d ("apertures 115"), respectively. It should be noted while the embodiment of FIG. 1 illustrates four imaging channels to a 2×2 array, in other embodiments can include any number of imaging channels in any arrangement. In addition, each of the imaging channels illustrated in FIG. 1 can include one or more chromatic filters (not shown in FIG. 1).

The camera system 100 also includes a central processing unit ("CPU") 120, an image sensor 125, an image signal processor ("ISP") 130, and a memory 135. Other embodiments of the camera system 100 can include fewer, additional, or different components, and the functionalities of the components described herein can be distributed other than as described herein. For example, the camera system 100 can include various input/output components, synchronization components, sensor modules, and the like, not illustrated herein for the purposes of simplicity. It should be noted that although various hardware embodiments are described herein, the registration functionalities described herein can be implemented in pre-existing hardware, for instance via firmware or software, or combinations of hardware and software.

The CPU 120 is configured to manage operations of the camera system 100 and process image data collected via the imaging channels 105. For example, the CPU 120 can direct the camera system 100 to power on or off (for instance, in response to user input), can direct the imaging channels 105 to direct light onto the image sensor 125, and can direct the image sensor to capture light incident upon the image sensor. Further, the CPU 120 can direct the ISP 130 to process image data captured by the image sensor 125, and can store the processed image data in the memory 135. It is noted that "image data" or "image information" refers to properties or characteristics of a captured image. For instance, image data can refer to image color information, luminance information, brightness information, texture information, and the like. "Pixel data" or "pixel information" refers to image information associated with one or more image pixels.

The image sensor 125 is configured to capture light incident upon the image sensor (for instance, light directed by the imaging channels 105 via the lenses 110 and apertures 115). In one embodiment, the image sensor 125 includes four sub-sections, each associated with a different image channel. In such an embodiment, each imaging channel 105 directs light onto an associated image sensor sub-section. In other embodiments, the image sensor 125 includes multiple distinct image sensors, for instance one image sensor for each imaging channel 105. As used herein, "capturing light" refers to the conversion of light incident upon the image sensor 125 into electrical signals. The image sensor 125 can include a charge coupled device ("CCD") or a CMOS sensor to convert captured light into electrical signals.

The ISP 130 receives electrical signals representing captured light from the image sensor 125 and converts the electrical signals into digital signals ("image data" herein). The ISP 130 can manipulate the image data by performing one or more operations on the image data. For example, the ISP 130 can compress the data into one or more image file formats, can modify the image represented by the image data (by adjusting the color levels of the image, the brightness of the image, and the like), and can combine image data associated with preliminary images to form a final image based on the preliminary images. In some embodiments, the ISP 130 can apply an object shift to one or more objects in the preliminary images to align the preliminary images prior to combining the preliminary images.

After converting the electrical signals into image data and manipulating the image data, the ISP 130 can store the image data in the memory 135. The memory 135 can be any non-transitory computer-readable storage medium, for instance RAM, flash memory, and the like.

In the embodiment of FIG. 1, the four imaging channels 105 include a similar field of view (for instance, all four lens are pointed in a similar direction). Further, in one embodiment, a first imaging channel includes a broad-band spectral filter (the "white channel"), a second imaging channel includes a red color filter (the "red channel"), a third imaging channel includes a green color filter (the "green channel"), and a fourth imaging channel includes a blue color filter (the "blue channel"). Each preliminary image captured via the imaging channels will include different image information based on the characteristics of the imaging channel and any filters included within the imaging channel, such as different color information, different luminance information, and the like.

Figure 2A:
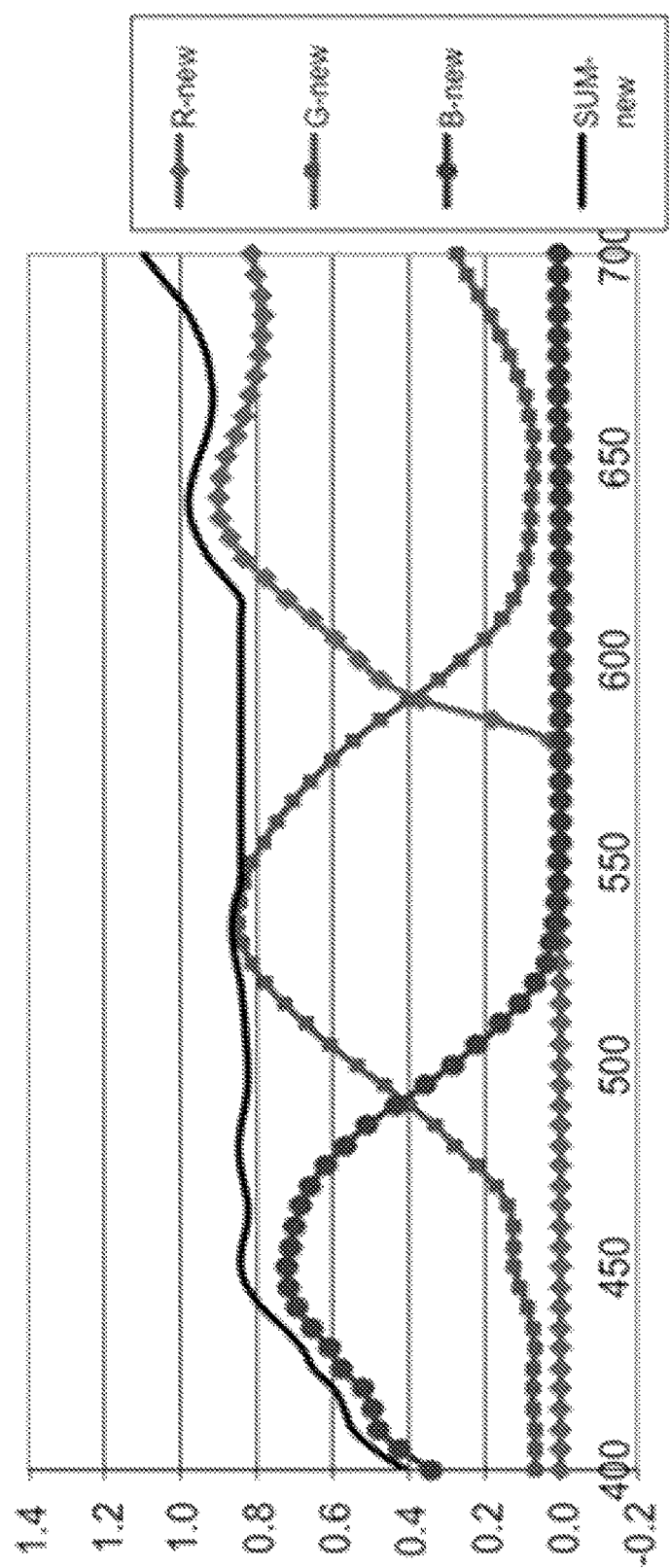
FIGS. 2a-2c illustrate example spectral transmissions of various color filters included within imaging channels, according to one example embodiment.
Figure 2B:
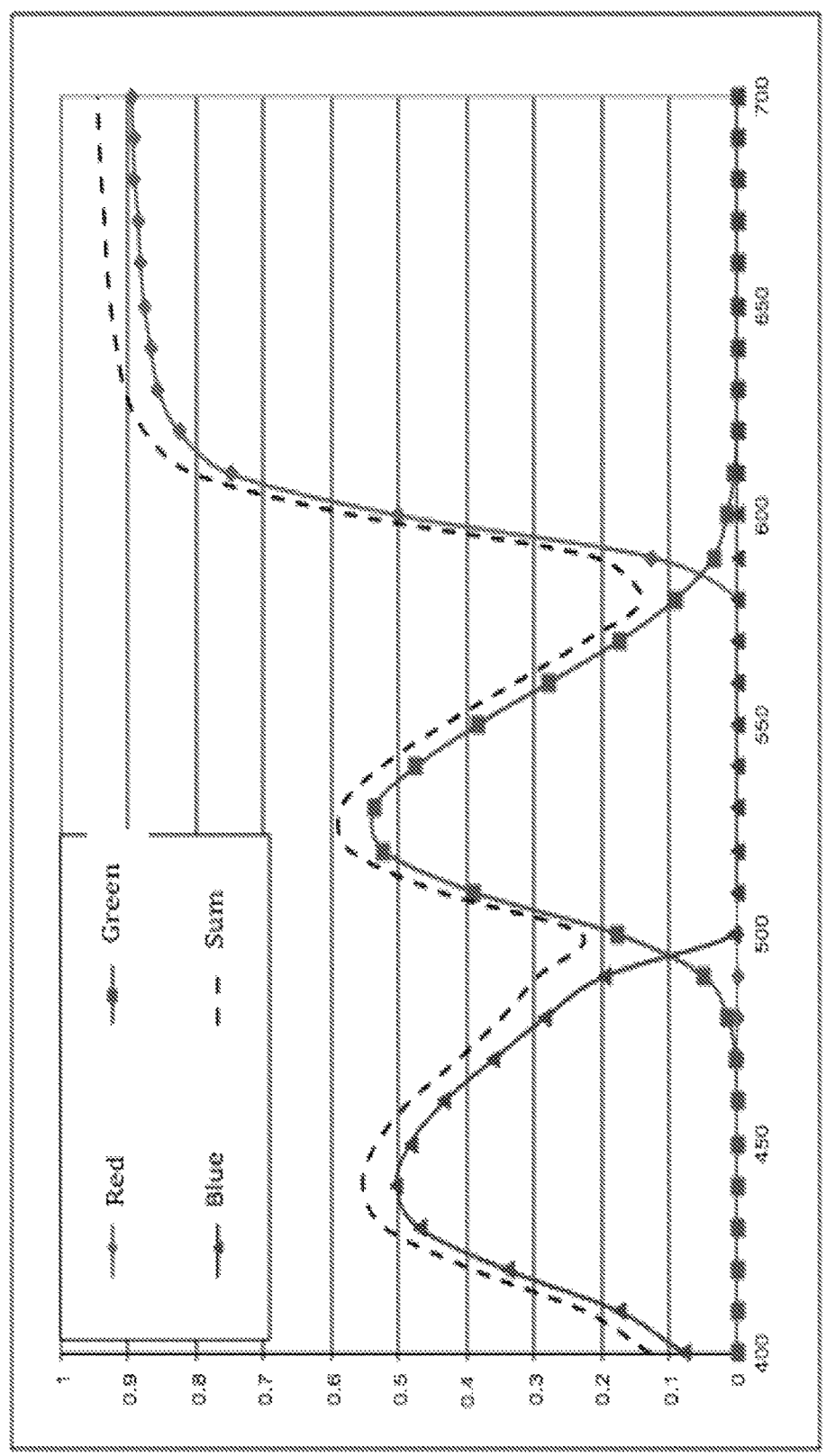
Figure 2C:
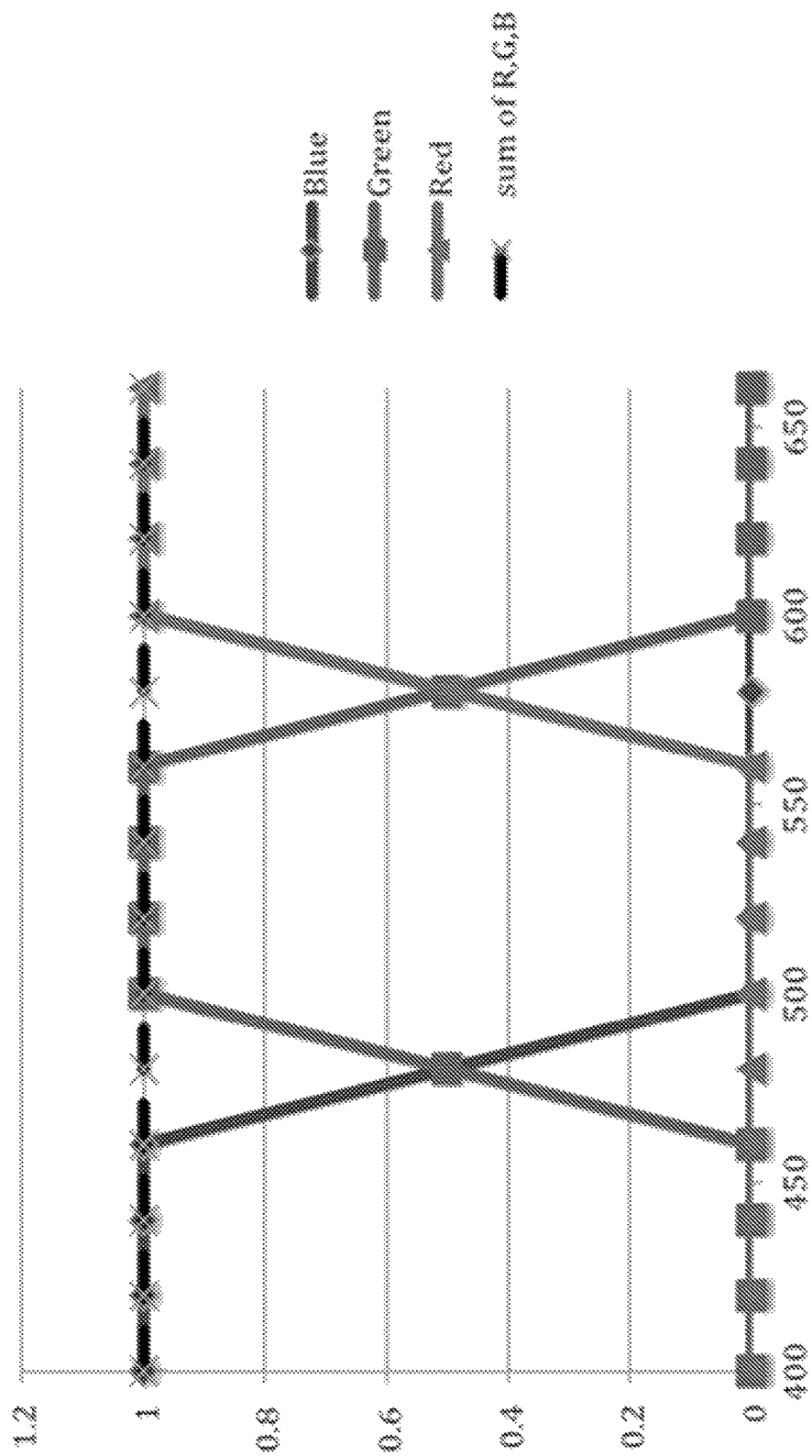

FIGS. 2a-2c illustrate example spectral transmission passbands of the red, green, and blue color filters included within the red channel, the green channel, and the blue channel, respectively. The x-axis in the embodiments of FIGS. 2a-2c represents light wavelength, and the y-axis represents the fraction of light at each particular wavelength that is transmitted through the various filters. FIGS. 2a-2c also include the sum of the three color filter transmission passbands. In the embodiment of FIG. 2a, the sum of the three color transmission passbands is substantially constant between wavelengths of 450 nm and 610 nm. In other words, the sum of the three color transmission passbands can be approximately equal to the transmission passband curve of the white color filter (regardless of the chromatic properties of an object in a captured image), when each are multiplied by a coefficient selected to compensate for various passband transmission characteristics discrepancies between the filters. For example, if the green channel passband indicates that a lower fraction of light is transmitted through the green filter, the green channel passband may be multiplied by a coefficient greater than 1 such that the resulting passband/coefficient product is roughly equal to the fraction of light transmitted through the red and blue filters as indicated by the red and blue passbands, respectively. Similarly, the coefficients can vary within each color filter passband based on location within the image to compensate for the change in spectral transmission curve when light enters a camera lens at non-perpendicular angles.

In the embodiment of FIG. 2b, in contrast to FIG. 2a, the sum of the three color transmission passbands is not substantially constant over the illustrated wavelengths. In such an embodiment, the color filters have been selected such that the sum of the red, green, and blue transmission passbands is dependent on wavelength. As will be discussed below, using such color filters may not allow calculating the object distances such that error is substantially minimized as described below. The reason for this is because distances determined according to equation 1 for objects with spectral properties that fall at different points in the transmission passband sum may not represent minimized mis-registration errors.

It should be noted that in various embodiments, color filters can be selected such that the areas below the curves associated with the color filters are substantially near equal. Such an embodiment helps avoid scenarios where a preliminary image captured by a first imaging channel is saturated while a preliminary image captured by a second imaging channel is not. In addition, to optimize the spectral range of the imaging channels, color filters can be selected such that the spectral transmission overlap between colors is minimized.

In the embodiment of FIG. 2c, the sum of the spectral transmission passbands of the red, green, and blue color filters is substantially constant over the entire illustrated wavelength range. FIG. 2c represents a scenario in which the physical properties of the color filters are nearly ideal, allowing for optimum color transmission within various wavelength ranges, substantially minimizing the spectral overlap between colors, and resulting in near equal areas below the curve for each color. The mis-registration error of an image captured with the color filters of the embodiment of FIG. 2c is minimized.

As noted above, the imaging channels 105 of FIG. 1 can include color filters. In one embodiment, color filters and lens are selected such that for each pixel located at the coordinate (x, y) in a final image captured by a camera system 100 and for a target object associated with any given visible wavelength WL, the following equality is satisfied:

$$F(P_1(x_1,y_1),P_2(x_2,y_2), \ldots ,P_n(x_n,y_n),x,y)=0 \quad \text{Equation 1}$$

In equation 1, n is the number of preliminary images captured by a camera system, $P_k$ refers to the kth preliminary image, $P_k(x_k, y_k)$ refers to pixel information (such as color information, luminance information, and the like) of the pixel $(x_k, y_k)$ of preliminary image $P_k$. In equation 1, F is a function of preliminary image pixel information independent of the wavelength of light associated with the target object. By selecting color filters and lenses to best satisfy equation 1 (that produce a value of F closest to 0), each color filter and lens combination can be unique, allowing for the combination of the preliminary images $P_1$ through $P_n$ without requiring redundant or duplicative color filters/lens combinations.

In one example embodiment, the camera system 100 includes four channels, a white channel, a red channel, a green channel, and a blue channel. In this embodiment, the function F of equation 1 can be $P_W(x_1, y_1)-P_R(x_2, y_2)-P_G(x_3, y_3)-P_B(x_4, y_4)=0$. The function F of equation 1 can also include coefficients used to weight the various pixel information associated with each preliminary image. For example, if the camera system 100 includes a white channel, a cyan channel, a magenta channel, and a yellow channel, the function F of equation 1 can be $P_W(x_1, y_1)-0.5*[P_C(x_2, y_2)+P_M(x_3, y_3)+P_y(x_4, y_4)]=0$. In some embodiments, the function F can weight the pixel information associated with each channel differently, for instance based on a pre-determined quality or importance of each imaging channel.

In one example embodiment, the camera system 100 includes six channels with the following transmission passband ranges:
Channel 1: 400 nm to 450 nm
Channel 2: 450 nm to 500 nm
Channel 3: 500 nm to 550 nm
Channel 4: 550 nm to 600 nm
Channel 5: 600 nm to 650 nm
Channel 6: 400 nm to 650 nm In this embodiment, the function F can be $P_6(x_6, y_6)-P_1(x_1, y_1)-P_2(x_2, y_2)-P_3(x_3, y_3)-P_4(x_4, y_4)-P_5(x_5, y_5)=0$. Alternatively, the function F can be $a*P_6(x_6, y_6)-b*P_1(x_1, y_1)-c*P_2(x_2, y_2)-d*P_3(x_3, y_3)-e*P_4(x_4, y_4)-f*P_5(x_5, y_5)=0$, where a, b, c, d, e, and f are coefficients determined in advanced or based on characteristics or properties of the preliminary images.

Registration in such instances can be performed (for instance, by the ISP 130) by determining a distance map d(x, y) that results in preliminary images that best satisfy equation 1 for all or most pixels after compensating for the parallax between preliminary images based on d(x, y). In various embodiments, all or a subset of the preliminary images can be used to determined a distance map d(x, y).

The distance map d(x, y) is a set of distances representing, for each pixel (x, y) in the final image, a distance between the camera system 100 and the object in the final image associated with the pixel (x, y). The distances of the distance map can be determined by first selecting a set of preliminary image pixels that best satisfies equation 1, and then determining a distance based on a selected set of preliminary image pixels. In the example embodiment described above in which the function F is $P_W(x_1, y_1)-P_R(x_2, y_2)-P_G(x_3, y_3)-P_B(x_4, y_4)=0$, a set of four preliminary image pixels is selected (one for each preliminary image) such that $P_W(x_1, y_1)-P_R(x_2, y_2)-P_G(x_3, y_3)-P_B(x_4, y_4)$ is as close to 0 as possible (or within a pre-determined threshold of 0). In some embodiments, the set of preliminary image pixels are located within a threshold distance of a particular preliminary image pixel. For example, for an M×N preliminary image pixel grid, a set of pixels can be selected within 4 pixels of a reference preliminary image pixel. In other words, for a pixel $(x_1, y_1)$ in the white channel preliminary image, the pixels $(x_2, y_2)$, $(x_3, y_3)$, and $(x_4, y_4)$ can be selected from the red channel preliminary image, green channel preliminary image, and the blue channel preliminary image, respectively, that 1) best satisfies equation 1, and 2) that are within 4 pixels of $(x_1, y_1)$ within the M×N pixel grid.

Once a set of preliminary image pixels associated with the final image pixel (x, y) is selected that best satisfies equation 1, a distance is determined for the final image pixel (x, y) based on the selected set of preliminary image pixels. A distance can be determined based on the variance of location of each of the selected preliminary image pixels, based on a pre-determined shift in pixel location of each of the selected preliminary image pixels, based on the average distance between selected preliminary image pixels, based on a particular selected preliminary image pixel, or based on any other suitable criteria. For instance, if the selected preliminary image pixels are on average 2 pixels away from the final image pixel (x, y) in an M×N image grid, a distance can be determined by querying a mapping between average selected preliminary image pixel distance and object distance. In various embodiments, the distances between selected preliminary image pixels and final image pixels is linearly proportional to the object distance of an object represented by the final image pixel.

Object distances can also be determined by using the error function defined by equation 1. Equation 1 defines an error function equal to the value of F resulting from the determined distance that best satisfies equation 1 (in other words, the selected distance produces a value of F closest to but not necessarily equal to 0—the error is the resulting value of F). Knowing that an object is located from the camera system 100 at a distance between a minimum distance $d_{min}$ (for instance 10 cm) and a maximum distance $d_{max}$ (for instance, 10 m or infinity), the error function can be calculated for various distances (for example, 50 different sample distances), each associated with a set of pre-determined pixel shifts. Calculating an error using the error function and a set of pre-determined pixel shifts associated with a distance includes identifying a set of pixels associated with the pre-determined pixel shifts, and using the pixel information of the identified set of pixels to determine an error value associated with the distance. For example, for a first distance associated with a shift of one pixel, a first set of pixels one pixel away from a final image pixel can be identified, and for a second distance associated with a shift of two pixels, a second set of pixels two pixels away from a final image pixel can be identified. The distance associated with the smallest error value can be determined to be the actual object distance of a target object.

After determining the distance map d(x, y), an appropriate object shift can be determined (for instance, by the ISP 130) for each object in the preliminary images by querying the distance map d(x, y). By determining a distance map d(x, y) that best satisfies equation 1 for each final image pixel, object shifts can be determined that minimize or that substantially minimize mis-registration error (the difference between applied object shift in a final image for an object and the actual location of the object).

Each pixel (x, y) in a preliminary image captured via the white channel corresponds to a pixel (x+xr(d), y+yr(d)) captured by the red channel, a pixel (x+xg(d), y+yg(d)) captured by the green channel, and a pixel (x+xb(d), y+yb(d)) captured by the blue channel. Each of these corresponding pixels are associated with object shifts (xr(d), yr(d), xg(d), yg(d), xb(d), yb(d)) corresponding to objects or edges visible in the preliminary images.

The object shifts xr(d), yr(d), xg(d), yg(d), xb(d), and yb(d) are calculated (for instance, by the ISP 130) using equation 1, which defines an error function that can be calculated for any object distance d. The shifts xr(d), yr(d), xg(d), yg(d), xb(d), and yb(d) are a function of the object distance included in the distance map d(x, y). The relationship between each shift value and object distance can be determined in advance, for instance based on pre-determined measurements or fixed values.

It should be noted that the determined object shifts need not be scene dependent. The relationship between the object shifts and the object distances can be dependent on the properties of the color filters and lenses of the camera system 100. As a result, the relationship between object distance and object shift can be calibrated or calculated during, for example, the manufacture of the camera system 100. The determined object distance/object shift function can then be stored at the camera system 100, for instance in the memory 135. Thus, once object distances are determined for a particular image, the object shifts can be determined for the image.

The relationship between object shift and object distance can be represented by the function:

$$\text{Shift}(x,y) = f*BL/d(x,y) \qquad \text{Equation 2}$$

In equation 2, the object shift for a pixel (x, y) is defined as the product of the inverse of the object distance of the pixel in distance map d(x,y), "f" the focal length of the lens, and "BL" a coefficient representing the baseline distance between the apertures of two or more imaging channels. In some embodiments, values for "f" and "BL" can be stored at the camera system 100l, for instance in the memory 135. For example, to compute the shift xr(d) for a pixel (x, y), the distance of the pixel (x, y) is accessed from the distance map d(x, y), the values for "f" and "BL" are accessed from the memory 135, and the shift xr(d) is computed by dividing the accessed value of f*BL with the accessed distance of the pixel (x, y).

In one embodiment, color filters are selected for inclusion in the imaging channels 105 such that for any light wavelength and for a given pixel (x, y) aligned between each of the four preliminary images (one for each of the white, red, green, and blue channels), the following equality is satisfied:

$$W(x,y) = a(x,y)*R(x,y) + b(x,y)*G(x,y) + c(x,y)*B(x,y) \qquad \text{Equation 3}$$

In equation 3, W(x, y) refers to pixel information for the pixel (x, y) in the preliminary image captured by the white channel, and R(x, y), G(x, y), and B(x, y) refer to pixel information for a corresponding aligned pixel in the preliminary images captured by the red, green, and blue channels, respectively. In addition, the coefficients a(x, y), b(x, y), and c(x, y) can be selected based on the location of a pixel within each preliminary image. For example, a(x, y), b(x, y), and c(x, y) can be selected as the coefficients that best satisfy equation 3 when computing equation 3 using pixel information for pixels at several locations within the preliminary images. It should be noted that in some embodiments, a, b, and c are not spectrum dependent, and that the equality of equation 3 may be independent of wavelength.

Upon selecting the coefficients a(x, y), b(x, y), and c(x, y) for the pixel (x, y), the determined object shifts xr(d), yr(d), xg(d), yg(d), xb(d), and yb(d) can be applied to equation 3 to generate the equality:

$$W(x,y) = a(x,y)*R(x+xr(d), y+yr(d)) + b(x,y)*G(x+xg(d), y+yg(d)) + c(x,y)*B(x+xb(d), y+yb(d)) \qquad \text{Equation 4}$$

As noted above, xr(d) and yr(d) are object shifts within the red preliminary image, xg(d) and yg(d) are object shifts within the green preliminary image, and xb(d) and yb(d) are object shifts within the blue preliminary image. As also noted above, each of these object shifts are a function of the distance of an object from the camera system 100. In embodiments where the object shifts are known but the distance of an associated object from the camera system 100 is not known, the distance can be determined for each pixel in the final image using, for example, equation 2, or by reverse-querying the above-described relationship between object shifts and object distances using the known object shifts.

Figure 3:
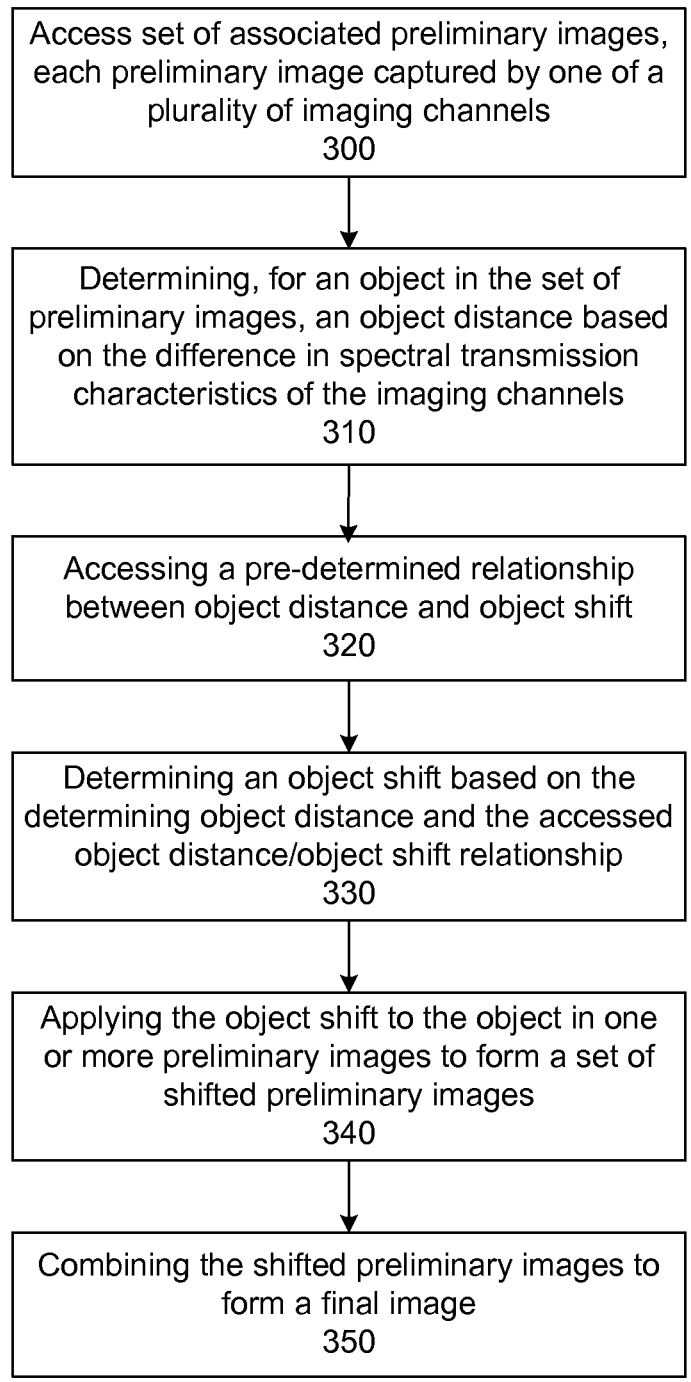
FIG. 3 illustrates a flowchart of a process for determining and applying an object shift, according to one example embodiment.

FIG. 3 illustrates a flowchart of a process for determining and applying an object shift, according to one example embodiment. The process described in the embodiment of FIG. 3 can be performed by the camera system 100 of FIG. 1 (specifically, the ISP 130 of FIG. 1), or can be performed by one or more of a camera, a computer, a mobile device, software, and firmware. In the process of FIG. 3, a set of preliminary images is accessed 300. The preliminary images are captured by a plurality of imaging channels, for instance four imaging channels with associated lenses arranged in a 2×2 configuration. At least two of the imaging channels include different spectral transmission characteristics.

An object distance is determined 310 for an object in the set of preliminary images. The object distance can be determined based at least in part on the different spectral transmission characteristics of two or more of the imaging channels. As noted above, the object distance can be determined by identifying a set of corresponding pixels associated with an object, one in each of a plurality of preliminary images, and determining a distance for the object based on the difference in location of each of the set of corresponding pixels. A pre-determined relationship between object distance and object shift is accessed 320. The pre-determined relationship can be based on the characteristics of the imaging channels, and can be stored at, for instance, a camera system associated with the imaging channels.

An object shift is determined 330 for the object based on the determined object distance and the accessed relationship between the object distance and object shift. The object shift is applied 340 to the object in one or more of the preliminary images to form a set of shifted preliminary images. The shifted preliminary images and then combined 350 to form a final image.

It should be noted that although various methods of determining a distance map d(x, y) for an image are described herein, any method of determining a distance for each object in an image may be implemented without affecting the remainder of the multiple imaging channel camera system functionality description herein. The distance map d(x, y) can be stored within a final image file, for instance within the EXIF addition to the JPEG standard, or within metadata of any other suitable image format.

It should also be noted that although red, green, and blue color filters are described herein, any suitable combination of color filters may be used. For example, filters for subtractive colors can be used, such as cyan, magenta, and yellow. In such an example, equations 2 and 3 can be adjusted to reflect the color filters used. Finally, while a 2×2 array of cameras is described herein, it should be noted that any number of cameras can be included in an array of any configuration, and any number of cameras in an array can include a color filter of the same color. For example, in a 4×4 array, four cameras can include white filters, four cameras can include red filters, four cameras can include green filters, and four cameras can include blue filters.

In certain embodiments, determining a comprehensive distance map as described herein may be problematic. In a first example, if an observed object has locally uniform colors, identifying image features associated with the object for use in determining object distance may be difficult. In other words if an object includes a uniform texture and color distribution such that detecting edges or other features becomes difficult, the methods of determining object distance described above can lead to unacceptable distance calculation errors for one or more pixels associated with the object. However, in some embodiments, even when calculating object shifts based on distances with unacceptable margins of error, applying the objects shifts may not cause image artifacts, since the resulting object shifts result in shifts in pixels surrounded by pixels of similar color and texture. Thus, shifting errors resulting from distance errors may result in the imperceptible shift of pixels to image locations with similar visual properties.

Figure 4:
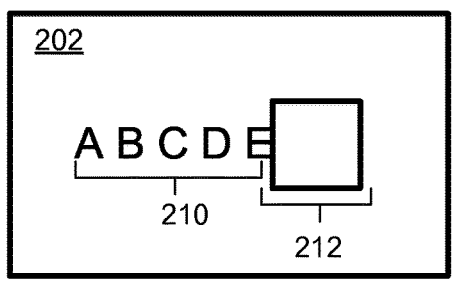
FIG. 4 illustrates an occlusion artifact in preliminary images captured via four imaging channels in a 2×2 camera array, according to one example embodiment.
Figure 4:
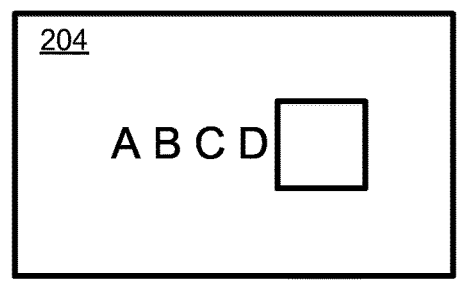
Figure 4:
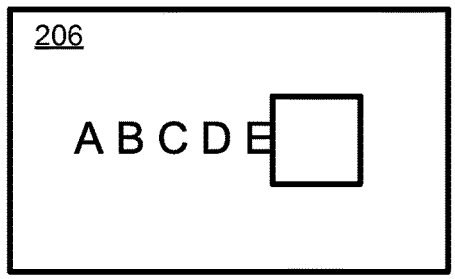
Figure 4:
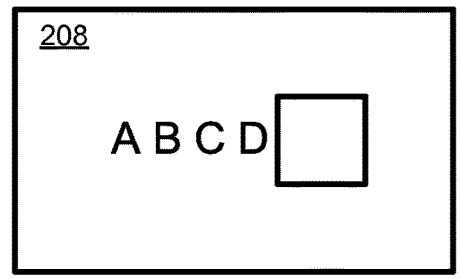

In a second example, if an observed object is present in some preliminary images but not others, the object may be occluded by an object closer to the camera system than the observed object (referred to herein as an "occlusion artifact"). FIG. 4 illustrates an occlusion artifact in preliminary images captured via four imaging channels in a 2×2 camera array, according to one example embodiment.

In the embodiment of FIG. 4, four preliminary images 202, 204, 206, and 208 each include two captured objects, the letters "A B C D E" 210, and a box 212. The box 212 is located closer to the camera system 100 than the letters 210. The occlusion of the letters 210 by the box 212 is the result of the different perspectives of the imaging channels 105 that captured the pair of preliminary images 204 and 208 and the pair of preliminary images 202 and 206. As a result, the box 212 partially occludes the letters in the preliminary images 204 and 208, but not in the preliminary images 202 and 206.

To address occlusion artifacts, the ISP 130 identifies pixels within the preliminary images representing the occlusion artifact. Pixels representing the occlusion artifact can be identified using the error function:

$$\text{Err}(x,y)=|W(x,y)-a(x,y)*R(x+xr,y+yr)-b(x,y)*G(x+xg, y+yg)-c(x,y)*B(x+xb,y+yb)| \quad \text{Equation 5}$$

In equation 5, W(x, y) represents a pixel in the white channel preliminary image; xr, yr, xg, yg, xb, and yb represent object shifts of a corresponding pixel in the red channel, green channel, and blue channel preliminary images, respectively; and a(x, y), b(x, y), and c(x, y) represent coefficients for the pixel (x, y) as determined in equation 3. A pixel (x, y) is considered occluded if Err(x, y)>T, where T is a pre-determined threshold representative of occluded pixels. It should be re-iterated that if the object shifts xr, yr, xg, yg, xb, and yb are computed using equation 3, the object shifts correspond to an object distance that substantially minimizes the error Err(x, y). In certain instances, for each pixel (x, y) that does not represent occlusion artifacts, Err(x, y) is less than the occlusion threshold T (and is likely minimal or zero). Likewise, in certain instances, for each pixel that does represent occlusion artifacts, Err(x, y) is greater than T.

It should be noted that although equation 5 describes one means of detecting occlusion artifacts, other means of detecting occlusion artifacts can also be used. For instance, the function F of equation 1 can be used such that any determined value of F>T indicates an occlusion artifact, and any value of F<T indicates no occlusion artifact is present.

In some embodiments, for a value of F<T, a distance associated with the determined value of F<T can be selected for use as a distance for inclusion in the distance map d(x, y).

Upon identifying preliminary image pixels representing occlusion artifacts, the identified pixels are treated to address potential false color artifacts at or around the identified pixels. Although occlusion artifacts can be largely addressed as described herein, it should be noted that in some instances, the original color information cannot be completely restored, and various interpolation techniques may be used to fill in missing color information. In some embodiments, false color artifacts are addressed by taking an average or weight average of color information of surrounding pixels that do not represent occlusion artifacts. For example, a square region of $2^K \times 2^K$ pixels is identified around a pixel representing an occlusion artifact, and the average color information for all pixels that do not represent an occlusion artifact is used to replace the color information of the pixel representing the occlusion artifact. In this example, K can be chosen so that at least 50% of all pixels in the identified square region do not represent occlusion artifacts. In some embodiments, the color information of each surrounding pixel is weighted based on a confidence that the surrounding pixel does not represent an occlusion artifact.

In some embodiments, the color information for pixels representing occlusion artifacts can be adjusted by selecting one of the preliminary images captured via an imaging channel 105 for use as a reference image. The reference image is used by the ISP 130 to identify object portions that should be visible in the final image after registration. In other words, portions of objects visible in other preliminary images that are not visible in the reference image are not included in the final image.

In addition, it should be noted that instead of replacing the color information for pixels representing occlusion artifacts with computed color information as described above, the color information for the occluded pixels can be replaced with an average or weighted average of the original color information of the occluded pixels and the computed color information for the pixels. In such embodiments, the weights applied to the computed color information can be based on the magnitude of the occlusion artifact determined using the methods described herein.

As described above, the camera system 100 can include a white channel, a red channel, a green channel, and a blue channel. The ISP 130 can use the preliminary image captured via the white channel (the "white image") as the source of luminance for the final image, and can use the preliminary images captured via the red, green, and blue channels (the "red image", "green image", and "blue image", respectively) as the source of color information. To estimate the color information for pixels representing an object in the white image and one of the red image, green image, and blue image, the following equality can be used:

$$W(x,y) = R(x,y) + G(x,y) + B(x,y) \qquad \text{Equation 6}$$

In equation 6, W(x, y) represents the intensity information for the pixel (x, y) in the white image, and R(x, y), G(x, y), and B(x, y) represent the intensity information for the pixel (x, y) in the red, green, and blue images, respectively. The existence of 2 or more intensity values for a particular pixel allows for the calculation of chrominance (color information). It should be noted that although equation 6 describes a relationship between intensity information, other embodiments can describe a similar relationship using color information, luminance information, or any other suitable image information metric.

In some embodiments, to compute adequate color information, the color information for at least three different colors is needed. However, in embodiments in which an object is present in only the white image and one of the red, green, and blue images, the sum of the color information of the other two of the red, green, and blue images can be determined. For example, if an object is present in the white image and blue image, but not the red image or the green image, the color information for pixels representing the object can be estimated based on the white image and blue image color information for the pixels representing the object. In this example, B(x, y) is known, and W(x, y)−B(x, y) can be determined. From this, it can be determined that W(x, y)−B(x, y)=R(x, y)+G(x, y). In other words, the blue image color information for the object is known, and the sum of the red image color information and the green image color information can be determined. From this, the individual red image color information and the green image color information can be estimated. It is noted that retrieving color information from one color imaging channel and estimating the color information for the other color imaging channels using the white channel can help mitigate the effects of occlusion artifacts.

Example Image Processing Applications

The principles described herein can apply to various image processing applications. One such image processing application is three dimensional face recognition and user verification. Two dimensional face recognition methods rely on two dimensional image information captured by a camera. Typically, an image of a user's face is captured (for instance, via a mobile phone camera), and the captured image is compared with a stored image of the user's face in order to verify a user (and unlock the mobile phone). However, two dimensional image data may not be secure, since presenting an image of the user's face to the camera may result in a false positive verification of the user. The use of image depth information (such as the distance map d(x, y) described above) associated with a user's face can help avoid false positive verification. For instance, a reference image of a user's face can be stored along with depth information associated with the reference image. The depth information can be used to identify features associated with depth variation of the user's face, such as eyes, ears, nose, and the like.

Capturing an image of the user's face (using, for instance, the camera system 100) and determining a distance map associated with the captured image allows the captured image to be compared with a stored image of the user's face and an associated distance map. If the captured image of a user's face and determined distance map is within a threshold similarity of the stored image and associated distance map, then the system can verify the user. In some embodiments, the system can simply determine whether a captured image has depth variation (in other words, the system can determine whether the captured image is an image of an actual face or just a photograph of a face). In such embodiments, if it is determined that the captured image has depth variation (e.g., the captured image is an image of an actual face), then the captured image can be compared to a stored image in order to verify the user.

Depth information determined for a captured image can be used to identify a face in a captured image. Upon identifying a face in a captured image, the camera system 100 can set exposure times and image gains best suited for capturing images of a face. For instance, during video conferencing, a light source may appear in the background behind a videoconference participant. In such instances, when a face is detected in an image with a background light source, exposure times and gains associated with the background light source (detected using a determined distance map) can be reduced and exposure times and gains associated with the face (detected using a determined distance map) can be increased. Gains and exposure times can be controlled for non-face objects as well, for instance by limiting over exposure of objects that are determined (using, for instance, a determined distance map) close to the camera system 100.

Gains can be applied to portions of a captured image based a determined distance map for the captured image. For instance, objects closer to a camera tend to be brighter than objects farther away from the camera when a camera flash is used. Accordingly, the gain for objects determined to be closer to a camera can be reduced, while the gains for objects determined to be further away from the camera can be increased. In devices with a front facing camera and display, the brightness/gain of the entire display can be adjusted relative to the distance of a detected face or part of a detected face (for instance, the eyes).

In some embodiments, the detection of a face viewing, for instance, a display, allows for the detection of the location of the eyes of a face. Upon detecting the location of the eyes of a face viewing a display, the parallax associated with the display of three dimensional image on the display can be adjusted based on the distance between the eyes, and the distance of the eyes from the display. Such embodiments allow for the display of three dimensional images on the display without requiring three dimensional glasses.

In some embodiments, a distance map or other depth information associated with a captured image and determined as described herein can be stored within an image file for the captured image, for instance within the EXIF metadata field of the JPG format. The distance map or depth information can be stored within an image file at a resolution equal to a capture image, less than the captured image, or greater than the captured image. Including a distance map within an image file allows a user to open, view, and edit images using conventional image processing applications unable to read depth information. At the same time, applications that can make use of image depth information can access the distance map stored within the image metadata. Storing a distance map or depth information associated with a captured image within an image file for the captured image enables applications that both can and cannot process/utilize depth information to access and display the image file.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera expansion module as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system for image processing, comprising:
a non-transitory computer-readable storage medium configured to store a set of preliminary images, each preliminary image captured via one of a plurality of imaging channels, each imaging channel comprising a chromatic filter, and each of the chromatic filters comprising a spectral transmission passband with a different frequency range; and
an image processor configured to:
access the set of preliminary images;
select a corresponding pixel in each of the accessed preliminary images, the selected pixels associated with an object;
access an error function comprising a function of pixel information for a pixel in each of the accessed preliminary images;
determine an object distance based on the accessed error function and the selected pixels;
determine an object shift based on the determined object distance;
determine that a first one or more pixels corresponding to the object in a first one of the preliminary images comprise an occlusion artifact;
mitigate the occlusion artifact by modifying the first one or more pixels based, at least in part, on:
a pre-determined relationship between the plurality of imaging channels, wherein the predetermined relationship comprises a function of each of the plurality of imaging channels; and
values of pixels in at least a second one of the preliminary images that correspond to the first one or more pixels;
apply the determined object shift to the selected pixels associated with the object to form a set of shifted preliminary images;
combine the shifted preliminary images to form a final image; and store the final image in the non-transitory computer-readable storage medium.

2. A system for image processing, comprising:
a non-transitory computer-readable storage medium configured to store a set of preliminary images representing an object and captured by a plurality of imaging channels; and
an image processor configured to:
access the set of preliminary images;
determine an object distance based on a difference in preliminary image information associated with the object;
access a first pre-determined relationship between object distance and object shift;
determine an object shift based on the determined object distance and the accessed first pre-determined relationship between object distance and object shift;
determine that a first one or more pixels corresponding to the object in a first one of the set of preliminary images comprise an occlusion artifact;
mitigate the occlusion artifact by modifying the first one or more pixels based, at least in part, on:
a second pre-determined relationship between values of corresponding pixels across the plurality of imaging channels, wherein the second pre-predetermined relationship comprises a function of each of the plurality of imaging channels; and
values of pixels in at least a second one of the set of preliminary images that correspond to the first one or more pixels;
apply the determined object shift to the object represented by the set of preliminary images to form a set of shifted preliminary images;
combine the set of shifted preliminary images to form a final image; and
store the final image in the non-transitory computer-readable storage medium.

3. The system of claim 2, wherein the plurality of imaging channels comprise four imaging channels, each associated with one lens in a 2×2 lens configuration.

4. The system of claim 2, wherein a first imaging channel of the plurality of imaging channels comprises a red color filter, wherein a second imaging channel of the plurality of imaging channels comprises a green color filter, and wherein a third imaging channel of the plurality of imaging channels comprises a blue color filter.

5. The system of claim 4, wherein a fourth imaging channel of the plurality of imaging channels comprises a broad-band spectral filter.

6. The system of claim 5, wherein the image processor being configured to determine the object distance comprises the image processor being configured to determine a difference in preliminary image color information associated with the object of two or more preliminary images of the set of preliminary images and the image processor being configured to determine the object distance based on the determined difference in preliminary image color information, wherein the two or more preliminary images of the set of preliminary images were captured by at least two of the first imaging channel, the second imaging channel, the third imaging channel, and the fourth imaging channel.

7. The system of claim 2, wherein the first pre-determined relationship between object distance and object shift comprises a function for each imaging channel mapping object distances to object shifts.

8. The system of claim 2, wherein the determined object shift comprises an x-coordinate shift and a y-coordinate shift.

9. The system of claim 2, wherein the determined object shift comprises a first shift component associated with a first preliminary image and a second shift component associated with a second preliminary image.

10. The system of claim 2, wherein the image processor being configured to apply the determine the determined object shift to the object comprises the image processor being configured to modify one or more preliminary images of the set of preliminary images by shifting a portion of the one or more preliminary images of the set of preliminary images representing the object by a distance based on the determined object shift.

11. A method for image processing, comprising:
accessing a set of preliminary images captured by a plurality of imaging channels, the set of preliminary images representing an object;
determining an object distance based on a difference in preliminary image information associated with the object;
accessing a first pre-determined relationship between object distance and object shift;
determining an object shift based on the determined object distance and the accessed first pre-determined relationship between object distance and object shift;
determining that a first one or more pixels corresponding to the object in a first one of the set of preliminary images comprise an occlusion artifact;
mitigating the occlusion artifact by modifying the first one or more pixels based, at least in part, on:
a second pre-determined relationship between values of corresponding pixels across the plurality of imaging channels, wherein the second pre-determined relationship comprises a function of each of the plurality of imaging channels; and
values of pixels in at least a second one of the set of preliminary images that correspond to the first one or more pixels;
applying the determined object shift to the object represented in the set of preliminary images to form a set of shifted preliminary images;
combining the set of shifted preliminary images to form a final image; and
storing the final image in a format for subsequent retrieval.

12. The method of claim 11, wherein the plurality of imaging channels comprise four imaging channels, each associated with one lens in a 2×2 lens configuration.

13. The method of claim 11, wherein a first imaging channel of the plurality of imaging channels comprises a red color filter, wherein a second imaging channel of the plurality of imaging channels comprises a green color filter, and wherein a third imaging channel of the plurality of imaging channels comprises a blue color filter.

14. The method of claim 13, wherein a fourth imaging channel of the plurality of imaging channels comprises a broad-band spectral filter.

15. The method of claim 14, wherein determining the object distance comprises determining a difference in preliminary image color information of two or more preliminary images of the set of preliminary images associated with the object and determining the object distance based on the determined difference in preliminary images color information, wherein the two or more preliminary images were captured by at least two of the first imaging channel, the second imaging channel, the third imaging channel, and the fourth imaging channel.

16. The method of claim 11, wherein the first pre-determined relationship between object distance and object shift comprises a function for each imaging channel of the plurality of imaging channels mapping object distances to object shifts.

17. The method of claim 11, wherein the determined object shift comprises an x-coordinate shift and a y-coordinate shift.

18. The method of claim 11, wherein the determined object shift comprises a first shift component associated with a first preliminary image and a second shift component associated with a second preliminary image.

19. The method of claim 11, wherein applying the determined object shift to the object comprises modifying one or more preliminary images of the set of preliminary images by shifting a portion of the one or more preliminary images of the set of preliminary images representing the object by a distance based on the determined object shift.

20. A camera system, comprising:
a first imaging channel comprising a red color filter;
a second imaging channel comprising a green color filter;
a third imaging channel comprising a blue color filter;
a fourth imaging channel comprising a broad-band spectral filter;
an image sensor configured to capture a first preliminary image via the first imaging channel, a second preliminary image via the second imaging channel, a third preliminary image via the third imaging channel, and a fourth preliminary image via the fourth imaging channel at the same time;
an image processor configured to:
  identify an object represented by two or more preliminary images of the captured preliminary images;
  determine an object distance based on a difference in preliminary image information associated with the object;
  apply an object shift to at least one preliminary image of the captured preliminary images based on the object distance;
  determine that a first one or more pixels corresponding to the object in a first one of the captured preliminary images comprise an occlusion artifact;
  mitigate the occlusion artifact by modifying the first one or more pixels based, at least in part, on:
    a pre-determined relationship between values of corresponding pixels across the first, second, third, and fourth imaging channels; and
    values of pixels in at least a second one of the captured preliminary images that correspond to the first one or more pixels; and
  combine the preliminary images to form a final image; and
a non-transitory computer-readable storage medium configured to store the final image.

* * * * *